March 25, 1924. 1,488,165
J. G. POORMAN
INCUBATOR
Filed July 11, 1921 2 Sheets-Sheet 1

Inventor,
John G. Poorman.
By Dyrenforth, Lee, Chritton & Wiles,
Attys.

March 25, 1924.  1,488,165

J. G. POORMAN

INCUBATOR

Filed July 11, 1921  2 Sheets-Sheet 2

Inventor,
John G. Poorman.

Patented Mar. 25, 1924.

1,488,165

UNITED STATES PATENT OFFICE.

JOHN G. POORMAN, OF TINLEY PARK, ILLINOIS.

INCUBATOR.

Application filed July 11, 1921. Serial No. 483,869.

*To all whom it may concern:*

Be it known that I, JOHN G. POORMAN, a citizen of the United States, residing at Tinley Park, in the county of Cook and State of Illinois, have invented new and useful Improvements in Incubators, of which the following is a specification.

My primary objects are to provide a novel, simple and inexpensive construction of incubator by which the functions for which such structures are provided may be performed in a highly advantageous manner, to the end that positive and accurate control of the heat to the chambers to which the heat is supplied, particularly in the hatching of eggs, may be effected and thereby losses, such as now commonly occur by reason of inadequate control and regulation of the heat, will be avoided; to provide for the proper heating of the incubating chambers without danger of contaminating the air by the products of combustion of the heating means employed, and to cause the air supplied to these chambers to present the desired degree of moisture; to provide a construction of incubator by which the air to be supplied to the incubator chamber is not required to be heated to as high a degree as in constructions as hitherto provided; and other objects as will be manifest from the following description.

Figure 1:
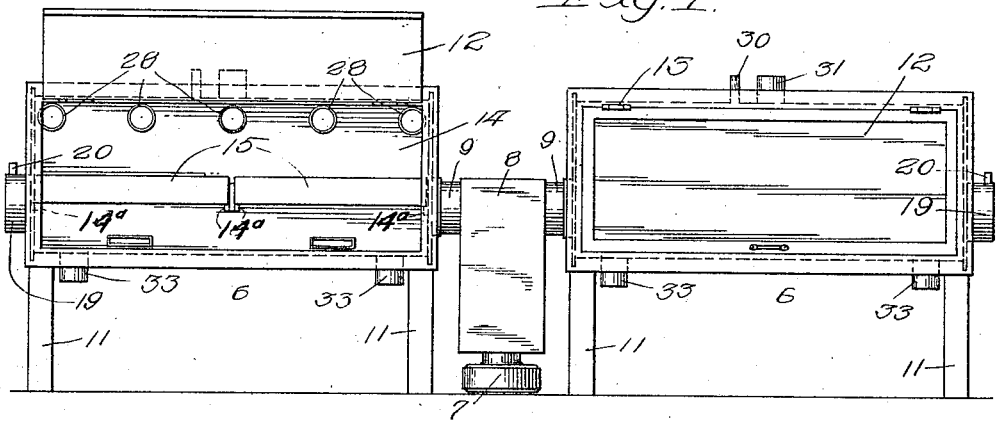
Figure 2:
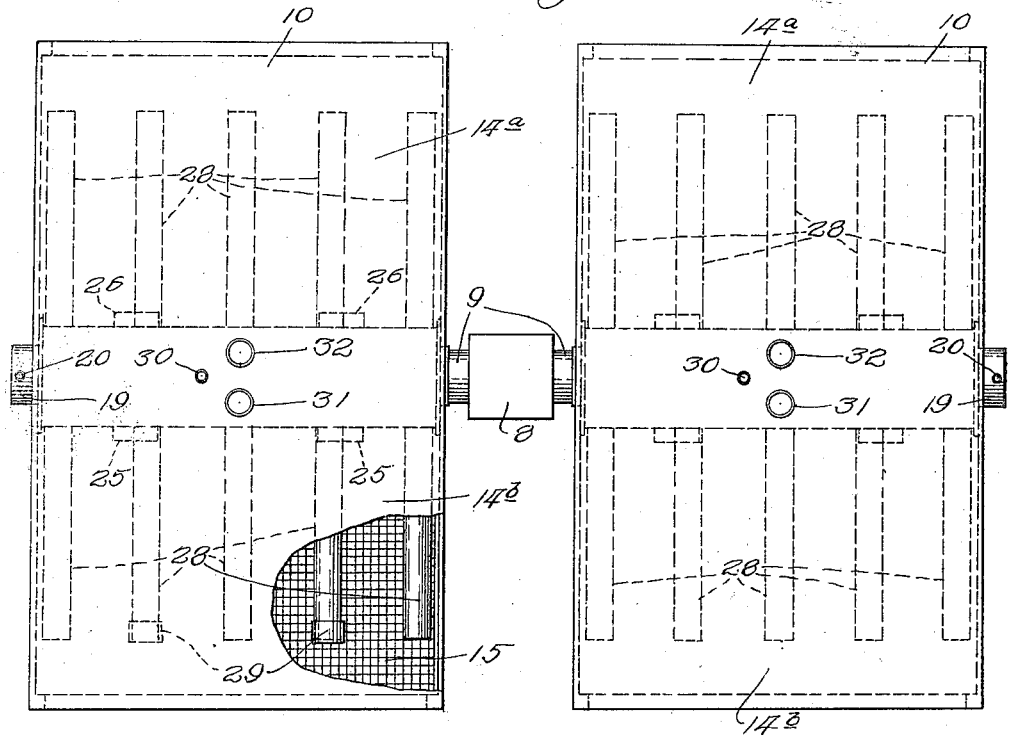
Figure 3:
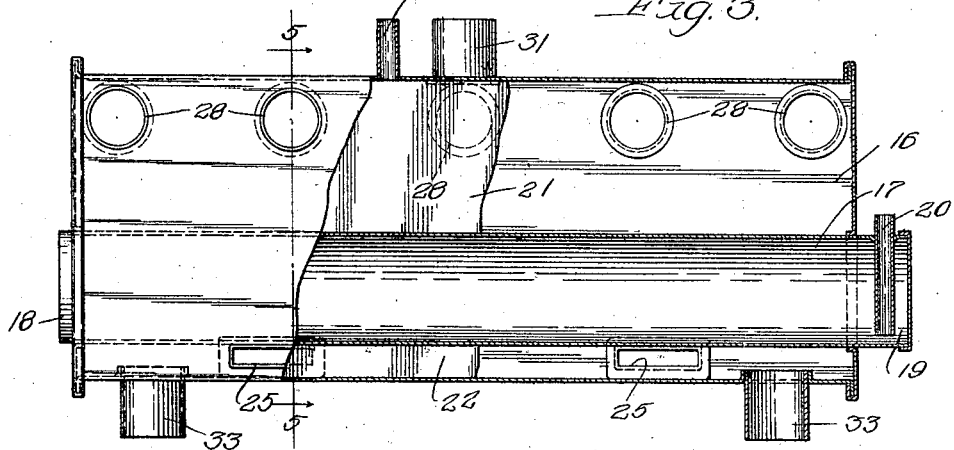
Figure 4:
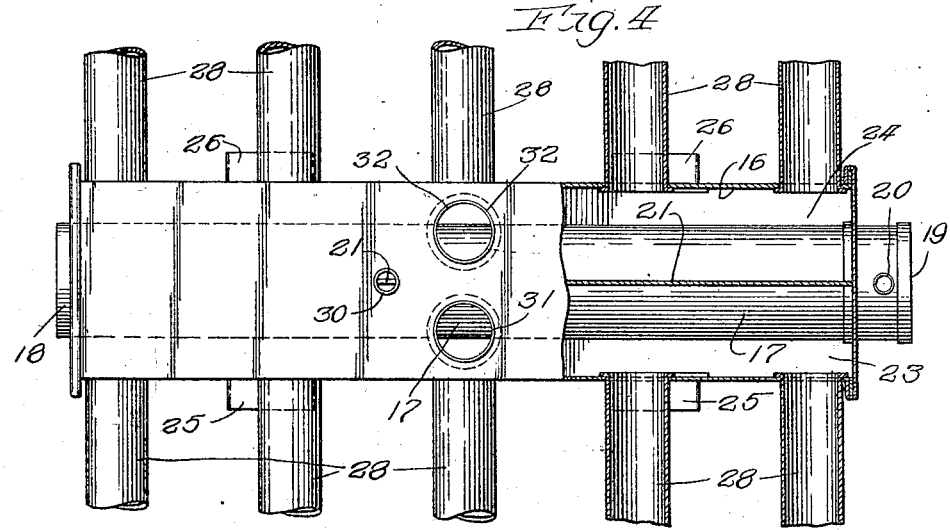
Figure 5:
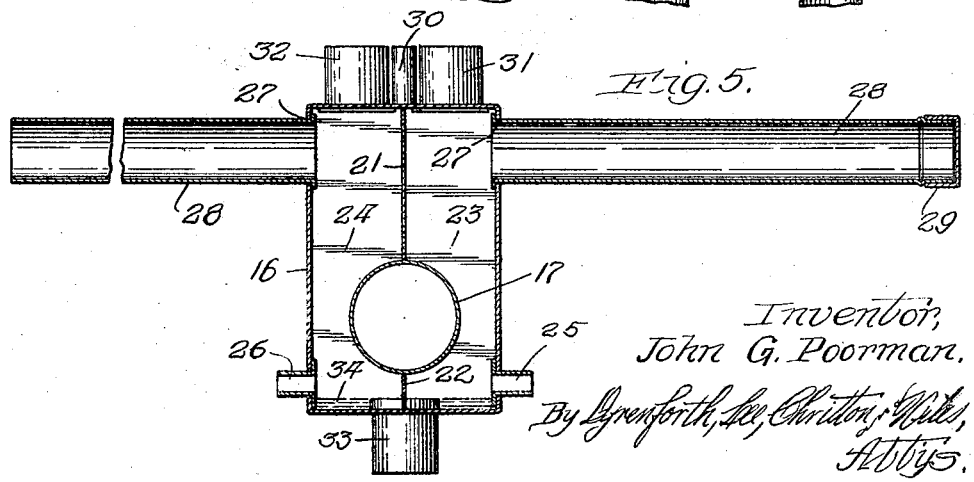

Referring to the accompanying drawings:

Figure 1 is a view in side elevation of an incubator installation constructed in accordance with my invention, the door for one of the incubator chambers being shown in raised position. Figure 2 is a plan view of the structure shown in Fig. 1, with a portion of the roof of one of the incubator chambers broken away to disclose an interior detail. Figure 3 is a cross-sectional view, with certain parts broken away, of one of the similar incubator units shown in Figs. 1 and 2. Figure 4 is a plan view, with certain parts shown in section, of the structure shown in Fig. 3; and Figure 5, a section taken at the line 5—5 on Fig. 3 and viewed in the direction of the arrows.

In view of the fact that I prefer to employ two incubator chamber units with each heater, as for example a kerosene lamp, but without any idea of limiting my invention thereby, I have illustrated my invention as embodied in such a duplex arrangement, the incubator chamber units which are represented at 6 and arranged in spaced relation being located at opposite sides of a source of heat, as for example a kerosene lamp 7, the upper portion of which opens into a drum 8 open at its lower end but closed at its upper end, this drum being provided with oppositely-extending pipe sections 9 communicating therewith and through which the air in the drum 8, heated by the lamp 7, and the products of combustion from the latter, pass in opposite directions into the incubator chamber units as hereinafter described, and for the purpose of supplying thereto the desired amount of heat.

Each of the units 6 is of the same construction and therefore the description as to one will suffice for both. The incubator unit is shown as comprising a box-like casing 10 mounted upon legs 11 and provided at its opposite, open, ends with doors 12, shown as hingedly connected with the casing 10, as indicated at 13, and affording means for access to the interior of the incubator chamber provided by the space within the casing 10 and represented at 14, these doors when closed serving to substantially close the chamber 14 to the atmosphere. Where the incubator is to be used for hatching eggs, the eggs by preference would be located on trays, one of which is represented at 15, and introduced into the incubator chamber 14 through the opposite ends thereof to rest upon tray-supporting flanges 14$^a$ provided within the chamber 14.

The casing 10 is provided intermediate its ends with a drum 16, as shown, formed of sheet metal and extending crosswise of the chamber 14 and preferably entirely across the latter, as shown, and reaching from the top to the bottom of the chamber to divide the latter into the compartments 14$^a$ and 14$^b$. The drum is shown as of rectangular shape in cross-section and contains a pipe 17 which extends lengthwise thereof and is spaced from the bottom of the drum, the ends 18 and 19 of this pipe extending beyond the ends of the drum, the interior of the pipe 17 being out of communication with the interior of the drum 16. The pipe 17 is connected at its end portion 18 with one of the pipe sections 9 whereby the heated air and the products of combustion discharging from the drum 8 through one of the pipes 9, pass through the pipe 17 for heating the air within the drum 16, the end portion 19 of the pipe 17 being provided with a vent pipe 20 which opens at its upper end beyond the drum 16, through the top of the pipe 17, the lower open end of this vent pipe 20 extending to a point a slight distance above the bottom of the pipe 17 and serving as a vent for the air and products of combustion passing through the pipe 17 as stated. The drum 16 is provided with upper and lower partitions 21 and 22 which extend from the top of the drum 16 to the top of the pipe 17 and from the bottom of the drum 16 to the lower surface of the pipe 17, respectively, thereby to divide the drum 16 into two compartments 23 and 24, these compartments extending lengthwise of the drum 16 and being provided in the lower portions of their outer walls, with openings 25 and 26, respectively, shown as equipped with pipe sections, these openings communicating with the interiors of the compartments 14$^a$ and 14$^b$ respectively. The opposite side walls of the drum 16 are provided with series of openings arranged lengthwise of the drum and preferably equidistantly spaced apart, these openings, which are shown as five in number, but the number of which may be varied, though it is preferred that each side contain not less than five, being represented at 27 and located adjacent the top of the drum, these openings communicating with laterally-extending, preferably parallel, pipes 28, the pipes communicating with one series of the openings 27 extending out into the compartment 14$^a$ and the pipes communicating with the other series of openings in the drum 16 extending out into the compartment 14$^b$, all as illustrated in the drawings, there being provided for application to the outer open ends of the pipes 28, as conditions may render it advisable, caps 29 which serve to close the ends of the pipes to which they are applied and prevent discharge of warm air from the particular pipes thus capped, two of the pipes 28 being shown as capped in Fig. 2. The drum 16 is shown as provided with a pipe 30 open at its upper end and opening at its lower end into the interior of the drum at opposite sides of the partition 21, the top wall of the drum being also provided with pipe sections 31 and 32 open at their upper ends and opening at their lower ends, respectively, into the compartments 23 and 24, it being intended that, in practice, the pipes 31 and 32 be provided with damper means, not shown, such as are commonly used in incubator structures and controlled by any suitable thermostatic means, for automatically controlling the temperature within the compartments 14$^a$ and 14$^b$, to effect the maintenance of the desired temperature in these compartments, it being understood that the controls for the pipes 31 and 32 would, by preference, be independent of each other so that different temperatures could be maintained in the compartments 14$^a$ and 14$^b$ respectively, if desired.

The drum 16 also contains, in its lower wall, a pipe section 33 open at its lower end and opening at its upper end into the drum at opposite sides of the partition 22, and thus into both compartments 23 and 24, a slight distance, preferably ½" or so, above the bottom of the drum 16.

In accordance with one of the features of my invention the air which is caused to circulate over the eggs on the trays, is moistened, this being effected in the particular construction shown by so forming the drum 16 that its lower portion will hold a body of water such as represented at 34 and which preferably is maintained therein at a depth of about ½", the pipe section 30 being provided as a means of charging the water into the drum 16 to provide the bath referred to.

The operation of the construction shown is as follows: Assuming the lamp 7 to be burning, the hot products of combustion derived therefrom, and the air entering the drum 8 at its open, lower end, pass upwardly and thence outwardly through the pipe sections 9 into the pipes 17 and discharge from the latter to the atmosphere exterior of the chambers 10, through the vent pipes 20. Thus heating the pipe 17 heats the air in the drum compartments 23 and 24, the air rising therein and passing into the pipes 28 from which it discharges at the outer ends of the latter into the compartments 14$^a$ and 14$^b$. The drum compartments 23 and 24 being open to the interiors of the compartments 14$^a$ and 14$^b$ through the medium of the pipes 25 and 26, respectively, means are thereby provided whereby the air in the compartments 14$^a$ and 14$^b$ is caused to circulate therein, the air passing from these drum compartments through the pipes 28 through the compartments 14$^a$ and 14$^b$ the pipes 25 and 26 and back to the drum compartments, it being observed that the compartments 23 and 24 are closed to each other through the medium of the partitions 21 and 22 and the pipe 17 so that the air circulation in the compartments 14$^a$ and 14$^b$ is independent as to each compartment. The damper-controlled outlets 31 and 32 of the drum compartments 23 and 24, respectively, serve as a means whereby a certain control of the temperature in the compartments 14$^a$ and 14$^b$, may be effected independently of each other, the greater the opening of the dampers in these outlets, the greater the escape of heated air from these drum compartments and the cooler the temperature of the compartments 14$^a$ and 14$^b$, the pipe section 33 serving as a means through which fresh air is permitted to enter the drum compartments.

The provision of the water bath 34 in the bottoms of the drum compartments serves, by its exposure to the heat in these compartments, to charge the air therein, with moisture, thus supplying to the interiors of the compartments 14ᵃ and 14ᵇ air charged with moisture to the desired degree which, as hereinbefore explained, is an advantage in incubator constructions.

The feature of providing the series of outlet pipes 28 in the compartments 14ᵃ and 14ᵇ and leading from the heated air drum 16, especially in connection with the thermostatic control for the outlets 31 and 32, is of great advantage, as it is possible, by capping any one or more of the pipes of each series, as by the caps 29, to cause the compartments 14ᵃ and 14ᵇ, the temperature in which is controlled separately of each other, to be heated by heated air introduced therein from any number of these pipes as desired, this arrangement enabling the operator to have substantially perfect control of the temperature in the egg compartments, it being understood that these incubators are operated usually during all seasons of the year and are subjected to atmospheric temperatures of wide ranges. Furthermore, the provision of the heating means, shown as the lamp 7, between the two incubator units, is of advantage as it insures, in a construction involving one heating means for several of the incubator units, the uniform heating of both units.

It will also be noted that in accordance with the preferred construction illustrated, the heated air drum 16 is of relatively large cross-sectional dimensions, the inclusion of this feature in an incubator apparatus serving to insure the circulation of air best suited for the hatching of eggs, through the compartments 14ᵃ and 14ᵇ.

It will also be observed that by the provision of the series of pipes 28, a relatively large number of conduits, of very substantial cross-section, are provided for the carrying of the air from the drum compartments 23 and 24 into the compartments 14ᵃ and 14ᵇ, this arrangement, as I have demonstrated, in practice permitting of the employment of much less heat, for maintaining a given temperature in the compartments 14ᵃ and 14ᵇ, than is required where the air-circulating means are provided in accordance with the prior practice.

The provision of the vent pipe 20 which extends to a point close to the bottom of the pipe 17 is of advantage, as thereby the major portion of the heating medium traversing the pipe 17 is required to flow in an indirect course to its outlet from the pipe 17, as compared with the direct course which would be followed by the heating medium if the outlet from the pipe 17 were at the top of this pipe.

Furthermore it will be noted that while the heat generated by the heating means is conserved and utilized to the maximum extent, a practically perfect control and distribution of the heat supply to the compartments 14ᵃ and 14ᵇ for heating them substantially uniformly to any desired temperature is effected, and adequate provision is made for preventing the products of combustion generated by the heating means from entering the compartments 14ᵃ and 14ᵇ, whereby danger of the air in these compartments becoming contaminated, with the manifest disadvantage, is reduced to the minimum.

While I have illustrated and described my invention as embodied in a particular construction, I do not wish to be understood as intending to limit it thereto as the same may be variously modified and altered without departing from the spirit of my invention, and in this connection it may be stated that while the arrangement of a plurality of compartments, such as the compartments 14ᵃ and 14ᵇ heated from a single air pipe 17 and heated air drum 16 cooperating therewith, is a desirable one, certain features of my invention may be embodied in a structure in which but a single compartment is to be heated.

What I claim as new, and desire to secure by Letters Patent, is:

1. In an incubator, the combination of a plurality of chambers to be heated, a drum located between said chambers and provided with series of outlets in opposite walls thereof opening into said chambers, respectively, partitioning means in said drum dividing it into compartments into which said series of outlets open respectively, said partitioning means including a pipe out of communication with said drum, and means for heating said pipe to heat the air in said drum.

2. In an incubator, the combination of a plurality of chambers to be heated, a drum located between said chambers and provided with series of outlets in opposite walls thereof opening into said chambers, respectively, partitioning means in said drum dividing it into compartments into which said series of outlets open respectively, said partitioning means including a pipe out of communication with said drum, and means for heating said pipe to heat the air in said drum, the compartments of said drum also containing openings communicating with the interiors of said chambers for the passage of air into said compartments from said chambers.

3. In an incubator, the combination of chambers to be heated, a drum located between said chambers, said drum being provided in its opposite walls, adjacent the upper ends thereof, with a series of pipes opening into the drum and at their outer ends opening into said chamber, said pipes being located along said drum at spaced intervals, partitioning means dividing said drum lengthwise into compartments into which the said series of pipes open, respectively, said partitioning means including a pipe located in said drum and extending lengthwise thereof and closed to the interior of said drum, and heating means for heating said pipe, said drum compartments communicating below said outlet pipes, with the interiors of said chambers, respectively.

4. In an incubator, the combination of chambers to be heated, a drum located between said chambers, said drum being provided in its opposite walls, adjacent the upper ends thereof, with a series of pipes opening into the drum and at their outer ends opening into said chamber, said pipes being located along said drum at spaced intervals, partitioning means dividing said drum lengthwise into compartments into which the said series of pipes open, respectively, said partitioning means including a pipe located in said drum and extending lengthwise thereof and closed to the interior of said drum, heating means for heating said pipe, said drum compartments communicating below said outlet pipes, with the interiors of said chambers, respectively, and means for separately controlling the discharge of the heated air from said first-referred-to pipes into said chambers.

5. In an incubator, the combination of a plurality of chambers to be heated, a substantially horizontally disposed drum located between said chambers and extending substantially completely across the latter and provided with series of outlets in opposite walls thereof opening into said chambers, respectively, partitioning means in said drum and extending lengthwise thereof dividing the latter into compartments into which said series of outlets open, respectively, said partitioning means including a pipe which extends substantially the full length of said drum, said pipe being out of communication with said drum, and a heater communicating with said pipe, said pipe having an outlet.

6. In an incubator, the combination of a plurality of chambers to be heated, a substantially horizontally disposed drum located between said chambers extending substantially completely across the latter, said drum being provided in its opposite walls, adjacent the upper ends thereof, with a series of pipes opening into the drum and at their outer ends opening into said chamber, said pipes being located along said drum at spaced intervals, partitioning means in said drum and extending lengthwise thereof dividing the latter lengthwise into compartments into which the said series of pipes open, respectively, said partitioning means including a pipe located in said drum and extending substantially the full length of said drum, said pipe being closed to the interior of said drum, and a heater communicating with said pipe, said pipe having an outlet, and said drum compartments communicating below said outlet pipes, with the interiors of said chambers, respectively.

7. In an incubator, the combination of a chamber to be heated, a substantially horizontally-disposed drum extending substantially completely across said chamber and having a plurality of outlets at different points along the drum and opening into said chamber and having an inlet, a heater and a pipe in said drum and out of communication therewith, said pipe extending substantially the full length of said drum, said pipe being in communication with said heater for the passage therethrough of the products of combustion from said heater and having an outlet, the bottom portion of said drum being of trough shape for receiving water.

8. In an incubator, the combination of a chamber to be heated, a drum extending substantially completely across said chamber and provided with a plurality of outlet pipes extending therefrom and opening into said chamber adjacent the wall thereof opposite said drum and in spaced-apart relation, said drum containing an opening communicating with the interior of said chamber adjacent the bottom of the latter, and means for heating the contents of said drum.

9. In an incubator, the combination of a chamber to be heated, a substantially horizontally-disposed drum which constitutes a side wall of said chamber and extends substantially the height of the latter, pipes communicating with said drum and extending laterally therefrom into said chamber adjacent the upper portion of the latter, said pipes being located at different points along said drum and extending at their outlet ends adjacent the wall of said chamber opposite said drum, said drum containing an opening adjacent the lower end of said chamber and in communication with the latter, and means for heating the contents of said drum.

10. In an incubator, the combination of a chamber to be heated, a substantially horizontally-disposed drum in communication with said chamber and containing an inlet, and means for heating the contents of said drum, the bottom portion of said drum being of trough shape and adapted to retain a body of water therein for moistening the air.

JOHN G. POORMAN.